United States Patent
Hanazawa

(10) Patent No.: US 11,527,259 B2
(45) Date of Patent: Dec. 13, 2022

(54) LEARNING DEVICE, VOICE ACTIVITY DETECTOR, AND METHOD FOR DETECTING VOICE ACTIVITY

(71) Applicant: Mitsubishi Electric Corporation, Tokyo (JP)

(72) Inventor: Toshiyuki Hanazawa, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 314 days.

(21) Appl. No.: 16/970,203

(22) PCT Filed: Feb. 20, 2018

(86) PCT No.: PCT/JP2018/005938
§ 371 (c)(1),
(2) Date: Aug. 14, 2020

(87) PCT Pub. No.: WO2019/162990
PCT Pub. Date: Aug. 29, 2019

(65) Prior Publication Data
US 2020/0395042 A1 Dec. 17, 2020

(51) Int. Cl.
| G10L 15/00 | (2013.01) |
| G10L 25/84 | (2013.01) |
| G06N 3/04 | (2006.01) |
| G06N 3/08 | (2006.01) |
| G06N 7/00 | (2006.01) |
| G10L 25/30 | (2013.01) |
| G10L 25/78 | (2013.01) |

(52) U.S. Cl.
CPC ............ *G10L 25/84* (2013.01); *G06N 3/0454* (2013.01); *G06N 3/084* (2013.01); *G06N 7/005* (2013.01); *G10L 25/30* (2013.01); *G10L 2025/783* (2013.01)

(58) Field of Classification Search
None
See application file for complete search history.

(56) References Cited

U.S. PATENT DOCUMENTS

| 8,239,196 B1* | 8/2012 | Paniconi | G10L 25/84 704/226 |
| 2016/0034811 A1* | 2/2016 | Paulik | G06N 3/0454 706/20 |
| 2020/0005775 A1* | 1/2020 | Hanazawa | G10L 15/02 |
| 2020/0043504 A1* | 2/2020 | Li | G06N 3/0454 |
| 2020/0118544 A1* | 4/2020 | Lee | G10L 15/063 |

FOREIGN PATENT DOCUMENTS

JP 2001-343983 A 12/2001

* cited by examiner

*Primary Examiner* — Satwant K Singh
(74) *Attorney, Agent, or Firm* — Birch, Stewart, Kolasch & Birch, LLP

(57) ABSTRACT

A likelihood of voice that is a discrimination measure between noise and voice is corrected, by using a Gaussian mixture model of noise learned in a time section in which an input signal is noise, and a voice activity is detected on the basis of the corrected likelihood of voice.

5 Claims, 9 Drawing Sheets

LEARNING DEVICE, VOICE ACTIVITY DETECTOR, AND METHOD FOR DETECTING VOICE ACTIVITY

TECHNICAL FIELD

The present invention relates to a learning device, a voice activity detector, and a method for detecting a voice activity used for voice activity detection of an input signal.

BACKGROUND ART

In voice recognition processing, pattern recognition is performed on a voice activity detected from an input signal to obtain a recognition result, so that if there is an error in detection of the voice activity, recognition accuracy of the voice recognition processing is greatly reduced. For detection of the voice activity, there is a method for detecting, as a voice activity, an activity in which power of an input signal is greater than or equal to a threshold. The method is effective in an environment where background noise is relatively small and steady.

On the other hand, voice recognition which enables hands-free information input is a very effective user interface, in input of inspection results in maintenance work of plant equipment or in operation support of various factory automation devices (hereinafter referred to as FA devices).

However, the maintenance work environment of the plant equipment or the operation environment of the FA devices is often an environment in which loud noise is generated, and when detection of a voice activity is attempted by using the power of an input signal, unsteady noise is highly likely to be erroneously detected as voice. For this reason, detection accuracy of the voice activity is reduced, and sufficient recognition performance cannot be obtained also in the subsequent voice recognition processing.

To solve such a problem, for example, in Patent Literature 1, a method is devised for detecting a voice activity of an input signal by using a hidden Markov model (hereinafter, referred to as an HMM) with a cepstrum indicating a spectrum characteristic of the input signal as a parameter. In the method, an HMM of voice and an HMM of noise are learned, and a voice activity is detected on the basis of the likelihood of the learned HMM at the time of detection of a starting edge that is a start point of the voice activity. For example, in 12 frames (the number of frames existing in 120 milliseconds), when there are 4 or more frames with the highest likelihood of the HMM, the first frame of the 12 frames is detected as the starting edge of the voice activity.

CITATION LIST

Patent Literatures

Patent Literature 1: JP 2001-343983 A

SUMMARY OF INVENTION

Technical Problem

In the method described in Patent Literature 1, in an unknown noise environment that is not assumed in learning data used for learning the HMM of noise, the noise and the voice cannot be appropriately discriminated from each other and the noise activity may be erroneously determined as the voice activity, and there has been a problem that the detection accuracy of the voice activity is low.

The present invention is to solve the problem described above, and has an object to obtain a learning device, a voice activity detector, and a method for detecting voice activity which can improve the detection accuracy of a voice activity of an input signal.

Solution to Problem

A learning device according to the present invention learns a synthetic neural network and a Gaussian mixture model of noise and voice in a voice activity detector to detect a voice activity of an input signal, and includes processing circuitry. The processing circuitry learns a first neural network in such a manner that the first neural network calculates a likelihood of voice that is a discrimination measure between noise and voice, with a feature value of noise data and a feature value of voice data as learning data. The processing circuitry creates an initial value of a neural network indicating a structure in which a new intermediate layer is inserted between an output layer and a final layer of an intermediate layer of the first neural network. The processing circuitry learns a second neural network in such a manner that the second neural network discriminates between noise and voice, by using the initial value of the neural network and the learning data. The processing circuitry creates a third neural network, the third neural network having a structure in which an output layer of the second neural network is removed and a final layer of an intermediate layer of the second neural network is a new output layer, to output a bottleneck feature value suitable for discrimination between noise and voice from the new output layer. The processing circuitry creates the synthetic neural network, the synthetic neural network having parameters defining a same structure as a structure other than the output layer of each of the first neural network and the third neural network, to calculate the likelihood of voice and the bottleneck feature value. The processing circuitry learns the Gaussian mixture model of noise and voice, by using the bottleneck feature value output from the third neural network, and the learning data.

A voice activity detector according to the present invention includes processing circuitry. The processing circuitry analyzes a feature value of an input signal and creates time-series data of the feature value of the input signal. The processing circuitry calculates the bottleneck feature value by using the synthetic neural network created by the learning device with the created time-series data of the feature value as an input, in a time section in which the input signal is noise, and learns a Gaussian mixture model of noise in the time section by using the calculated bottleneck feature value. The processing circuitry calculates a correction likelihood of voice by using the Gaussian mixture model of noise and voice learned by the learning device and the learned Gaussian mixture model of noise with the created time-series data of the feature value as an input, and corrects the likelihood of voice calculated by the synthetic neural network, by using the correction likelihood of voice. The processing circuitry detects a voice activity of the input signal on the basis of a result of comparing the corrected likelihood of voice with a detection threshold.

Advantageous Effects of Invention

According to the present invention, the learning device creates the synthetic neural network for calculating the likelihood of voice that is a discrimination measure between noise and voice, and the bottleneck feature value suitable for discrimination between noise and voice, and learns the Gaussian mixture model of noise and voice, by using the bottleneck feature value suitable for discrimination between noise and voice, and the learning data. The voice activity detector learns the Gaussian mixture model of noise in the time section in which the input signal is noise, by using the synthetic neural network, and corrects the likelihood of voice by using the learned Gaussian mixture model of noise and the Gaussian mixture model of noise and voice. Since the voice activity detector detects the voice activity of the input signal on the basis of the result of comparing the corrected likelihood of voice with the detection threshold, the detection accuracy of the voice activity of the input signal can be improved.

DESCRIPTION OF EMBODIMENTS

Hereinafter, to explain the present invention in more detail, embodiments for carrying out the present invention will be described with reference to the accompanying drawings.

First Embodiment

Figure 1:
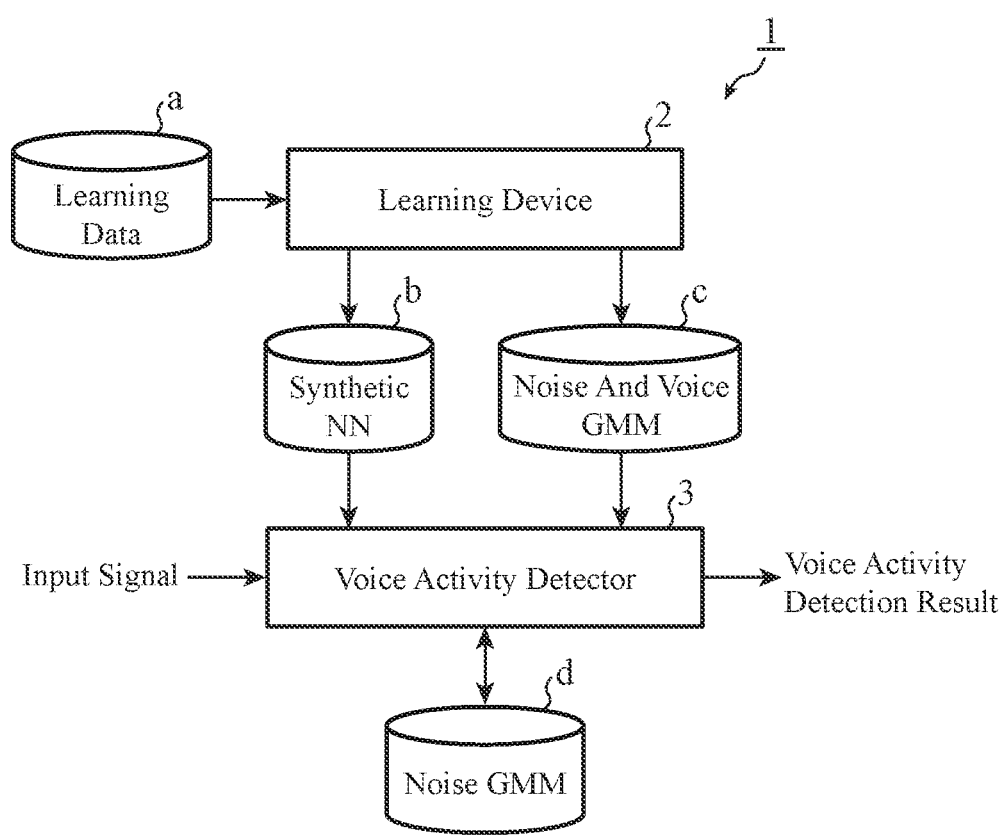
FIG. 1 is a block diagram illustrating a configuration of a voice activity detection system including a learning device and a voice activity detector according to a first embodiment of the present invention.

FIG. 1 is a block diagram illustrating a configuration of a voice activity detection system 1 including a learning device 2 and a voice activity detector 3 according to a first embodiment of the present invention. The learning device 2 inputs learning data a, creates a synthetic neural network (hereinafter, referred to as a synthetic NN) b, and learns a Gaussian mixture model of noise and voice (hereinafter, referred to as noise and voice GMM) c. The voice activity detector 3 detects a voice activity of an input signal on the basis of the synthetic NN b, the noise and voice GMM c, and a Gaussian mixture model of noise (hereinafter referred to as noise GMM) d, and outputs a voice activity detection result.

The learning data a is data including spectral feature values of noise data and voice data. The spectral feature value is, for example, vector data of from 1 to 12 dimensions of a mel-frequency cepstrum coefficient (hereinafter, referred to as an MFCC). Hereinafter, for simplicity of explanation, the vector data of from 1 to 12 dimensions of the MFCC is simply referred to as the MFCC. Since each of the noise data and the voice data is various data, it is assumed that there is a plurality of MFCCs for each of the noise data and the voice data.

The synthetic NN b has been learned to calculate a likelihood of voice that is a discrimination measure between noise and voice, and a bottleneck feature value suitable for discrimination between noise and voice. The noise and voice GMM c includes a Gaussian mixture model of noise and a Gaussian mixture model of voice, and is obtained by learning using the bottleneck feature value suitable for discrimination between noise and voice and using the learning data a. The noise GMM d is a Gaussian mixture model of noise learned in a time section in which the input signal is the noise.

Figure 2:
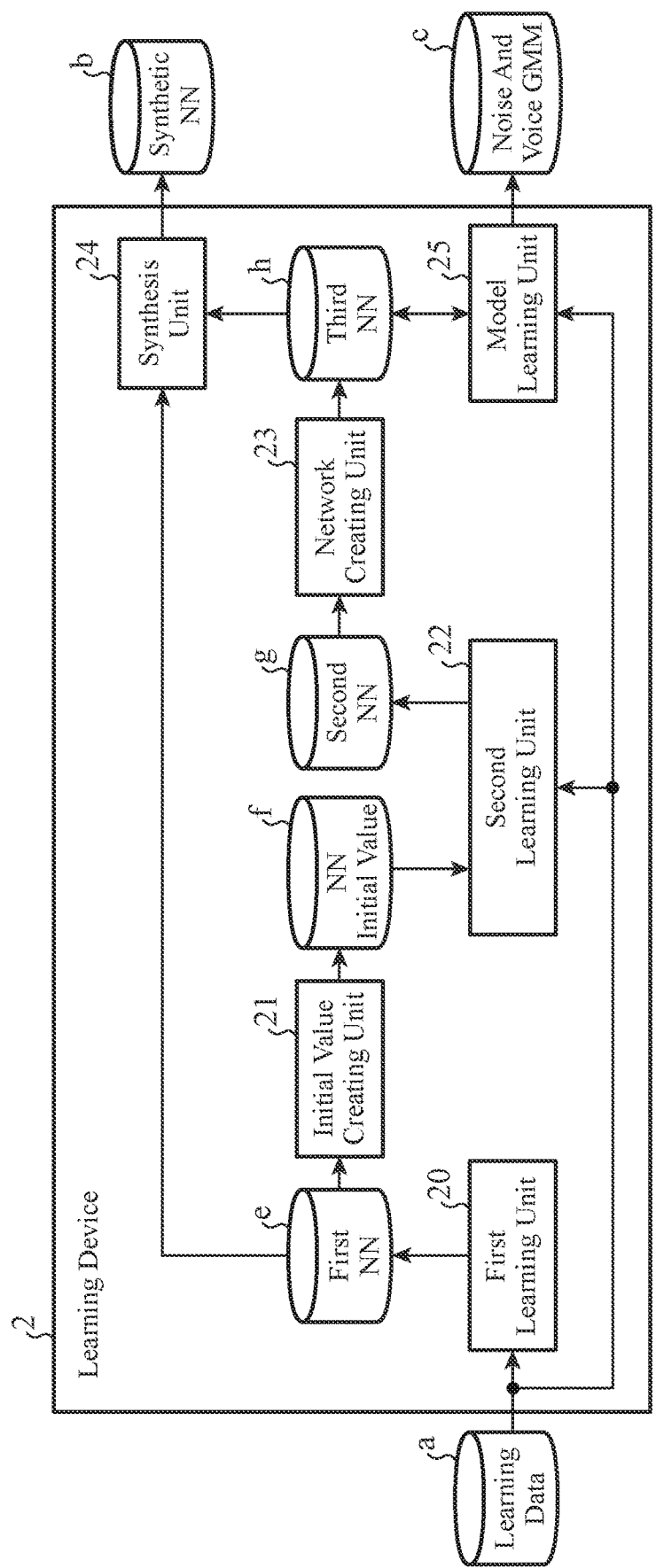
FIG. 2 is a block diagram illustrating a configuration of the learning device according to the first embodiment.

FIG. 2 is a block diagram illustrating a configuration of the learning device 2. The learning device 2 illustrated in FIG. 2 includes a first learning unit 20, an initial value creating unit 21, a second learning unit 22, a network creating unit 23, a synthesis unit 24, and a model learning unit 25. The first learning unit 20 learns a first neural network (hereinafter, referred to as a first NN) e by using the learning data a. The first NN e is a neural network learned to calculate the likelihood of voice that is a discrimination measure between noise and voice.

The initial value creating unit 21 creates an initial value (hereinafter, referred to as an NN initial value) f of a neural network used for learning a second neural network g on the basis of parameters defining the first NN e. Note that, the NN initial value f is a parameter defining a structure in which a new intermediate layer is inserted between a final layer of an intermediate layer and an output layer in the first NN e.

The second learning unit 22 learns the second neural network (hereinafter, referred to as the second NN) g for discriminating between noise and voice, by using the NN initial value f created by the initial value creating unit 21, and the learning data a.

The network creating unit 23 creates a third neural network (hereinafter, referred to as a third NN) h. The third NN h is a neural network having a structure in which an output layer of the second NN g is removed and a final layer of the intermediate layer is a new output layer, and an output value of the new output layer is the bottleneck feature value suitable for discrimination between noise and voice.

The synthesis unit 24 creates the synthetic NN b configured to calculate the likelihood of voice that is a discrimination measure between noise and voice, and to calculate the bottleneck feature value suitable for discrimination between noise and voice. The synthetic NN b has the same structure as a structure other than the output layer with each of the first NN e and the third NN h, and calculates the likelihood of voice that is an output value of the first NN e and the bottleneck feature value that is the output value of the third NN h.

The model learning unit 25 is a first model learning unit for learning the noise and voice GMM c, by using the bottleneck feature value output from the third NN h, and the learning data a.

For learning the Gaussian mixture model, for example, a maximum likelihood estimation method is used. In the maximum likelihood estimation method, parameters of a Gaussian mixture model, such as an average value of the feature values, and a variance weight and a mixture weight of the probability density of the feature value in the Gaussian distribution, are calculated so that a likelihood of the feature value included in the learning data a is maximized.

Figure 3:
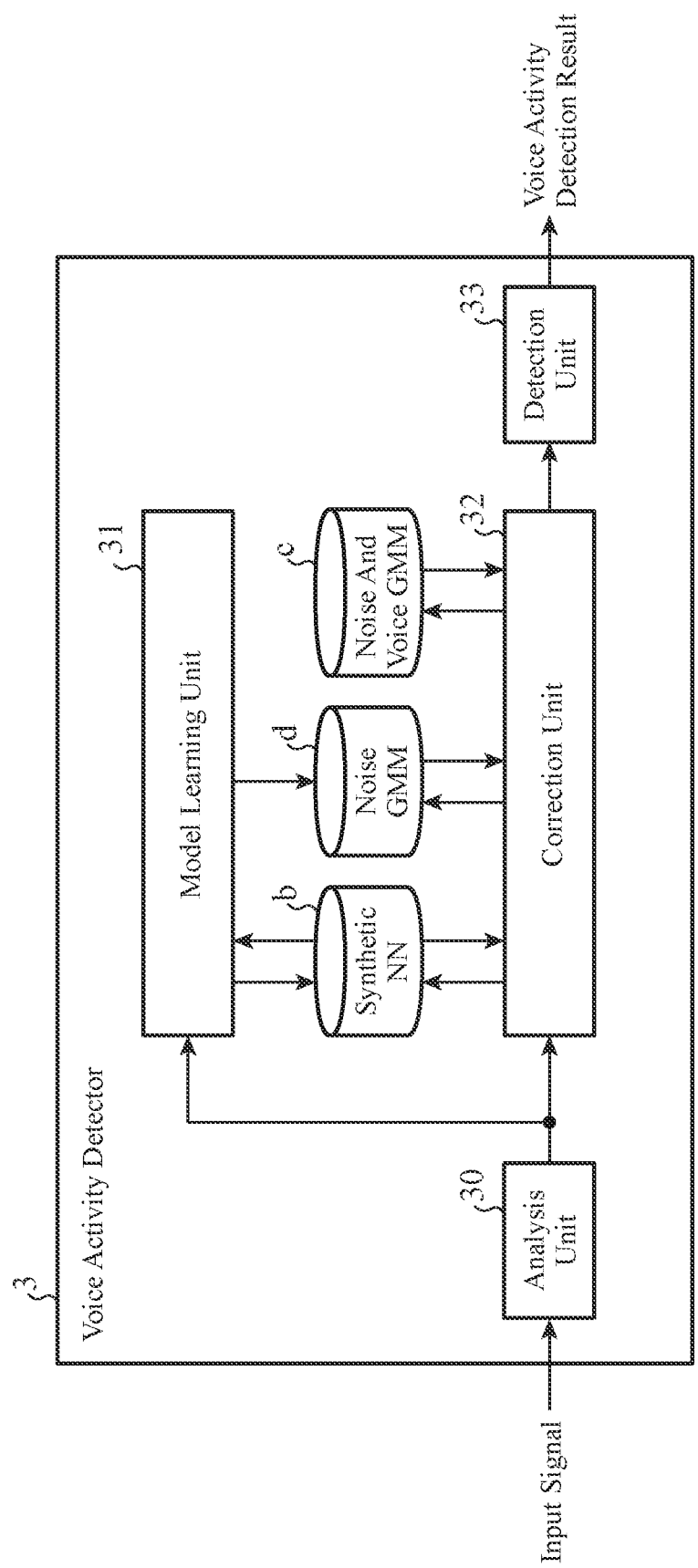
FIG. 3 is a block diagram illustrating a configuration of a voice activity detector according to the first embodiment.

FIG. 3 is a block diagram illustrating a configuration of the voice activity detector 3. As illustrated in FIG. 3, the voice activity detector 3 includes an analysis unit 30, a model learning unit 31, a correction unit 32, and a detection unit 33. The analysis unit 30 analyzes a feature value of an input signal and creates time-series data of the feature value of the input signal. For example, the analysis unit 30 analyzes a spectral feature value of the input signal, and creates time-series data in which feature values obtained by the analysis are arranged at certain time intervals.

The model learning unit 31 is a second model learning unit for learning the noise GMM d by using the synthetic NN b with, as an input, the time-series data created by the analysis unit 30.

For example, in a time section in which the input signal is noise, the model learning unit 31 calculates the bottleneck feature value suitable for discrimination between noise and voice by using the synthetic NN b with, as an input, the feature value of the input signal in the time-series data, and learns the noise GMM d by using the calculated bottleneck feature value. Here, the time section in which the input signal is noise is a time section in which it is known in advance that the input signal is noise. For example, by notifying a user of the voice activity detection system 1 in advance not to utter (output voice) for a specific time, it is possible to set a time section in which the input signal is other than voice, that is, noise. Hereinafter, this section is referred to as a noise learning section. As the noise learning section, for example, a time section from when the voice activity detector 3 is operated until when a certain time elapses may be set in the model learning unit 31.

The correction unit 32 calculates the likelihood of voice by using the synthetic NN b with, as an input, the time-series data of the feature value of the input signal created by the analysis unit 30. In addition, the correction unit 32 calculates a correction likelihood of voice, by using the noise GMM d learned by the model learning unit 31 and the noise and voice GMM c learned by the learning device 2 with, as an input, the time-series data of the feature value of the input signal. Then, the correction unit 32 corrects the likelihood of voice calculated by using the synthetic NN b, on the basis of the correction likelihood of voice.

The detection unit 33 detects the voice activity of the input signal, on the basis of a result of comparing the likelihood of voice corrected by the correction unit 32 with a detection threshold Sth. For example, the detection unit 33 detects, as the voice activity of the input signal, an activity in which the time-series data of the corrected likelihood of voice is continuously greater than or equal to the detection threshold Sth for a certain time or longer. The detection unit 33 outputs information indicating a start point and an end point of the voice activity, as a voice activity detection result.

Next, the operation will be described.

First, a description will be given of learning processing by the learning device 2.

Figure 4:
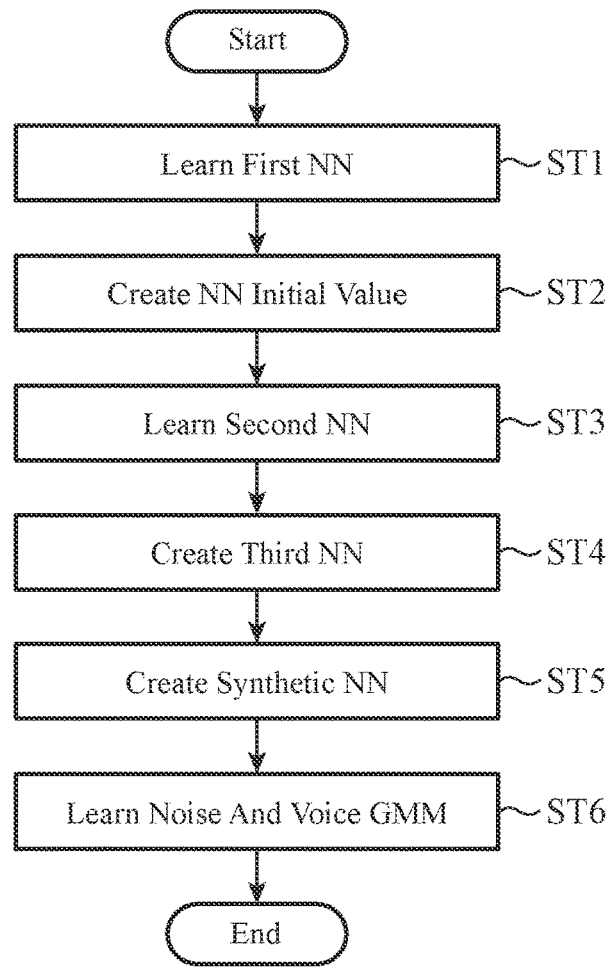
FIG. 4 is a flowchart illustrating a learning method according to the first embodiment.

FIG. 4 is a flowchart illustrating a model learning method according to the first embodiment.

First, the first learning unit 20 learns the first NN e by using the learning data a (step ST1). The first NN e has a hierarchical structure including an input layer, one or more intermediate layers, and an output layer, and each layer includes one or more units.

Figure 5:
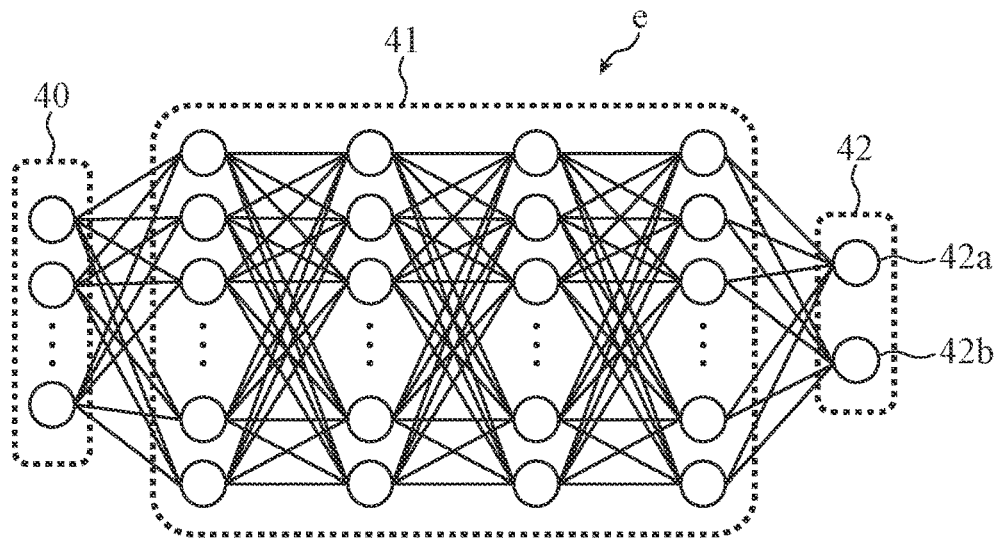
FIG. 5 is a diagram illustrating a structure of a first neural network.

FIG. 5 is a diagram illustrating the structure of the first NN e, and units are illustrated with round shapes. In FIG. 5, a set of units arranged vertically is a layer. The first NN e includes an input layer 40, an intermediate layer 41 of a plurality of layers, and an output layer 42. The input layer 40 includes units, the number of units being equal to the number of dimensions of the feature value that is input data, and each of these units is associated with a feature value for a corresponding one of the dimensions. Units in layers other than the input layer 40 are connected to units in an immediately preceding layer, and an input weight coefficient is given to each of the connections. The immediately preceding layer is a layer adjacent to each layer on the input layer 40 side of the corresponding layer.

The output layer 42 of the first NN e includes a noise unit 42a and a voice unit 42b. The first NN e is learned so that the noise unit 42a outputs a high value when the input is noise and the voice unit 42b outputs a high value when the input is voice.

Learning of a neural network is processing of determining an input weight coefficient that is a parameter of the neural network. For example, the input weight coefficient of the first NN e is learned by using the back propagation method. In learning the input weight coefficient using the back propagation method, the first learning unit 20 sets the input weight coefficient to a random value, and then gradually updates a value of the input weight coefficient so that cross entropy of the learning data a is decreased. The likelihood of voice calculated by the first NN e learned in this way is obtained as a difference obtained by subtracting an output value of the noise unit 42a from an output value of the voice unit 42b in the output layer 42.

Each of multiple units in the input layer 40 outputs the feature value of the corresponding dimension as it is. In the intermediate layer 41, to a unit of the layer adjacent to the multiple units of the input layer 40, a value is input that is obtained by multiplying output values of the respective multiple units of the input layer 40 by corresponding input weight coefficients given to respective connections between the multiple units of the input layer 40 and the unit of the adjacent layer, and by adding the multiplication results together. The unit of the intermediate layer 41 outputs a value obtained by converting an input value by a non-linear function. For example, a logistic sigmoid function is used as the non-linear function.

Also in a unit of a following layer, on the output layer 42 side, of the intermediate layer 41, a value is input that is obtained by multiplying output values of respective multiple units in the immediately preceding layer by corresponding input weight coefficients, and by adding the multiplication results together, and a value is output that is obtained by converting the input value by a non-linear function. In the units of the first NN e, these processes are sequentially performed up to the output layer 42, so that the output value of the noise unit 42a and the output value of the voice unit 42b are obtained. Hereinafter, the processing of calculating the output value of the neural network by inputting the feature value in this manner is referred to as output value calculation processing.

The description will be continued referring back to the description of FIG. 4.

The initial value creating unit 21 creates the NN initial value f on the basis of the parameters defining the first NN e (step ST2). A neural network defined by the NN initial value f has a structure in which a new intermediate layer is inserted between the final layer of the intermediate layer 41 and the output layer 42 in the first NN e. It is assumed that the number of units in the newly inserted intermediate layer is less than the number of units in the final layer of the intermediate layer 41. For example, when the number of units in the final layer of the intermediate layer 41 is 256, the number of units in the newly inserted intermediate layer is 16.

For the NN initial value f, an input weight coefficient given to each of connections between units of the final layer of the intermediate layer 41 and units of the newly inserted intermediate layer, and an input weight coefficient given to each of connections between the units of the newly inserted intermediate layer and units of the output layer are set with random values.

Note that, for an input weight coefficient given to each of connections between units in layers other than these, the same value as that of the first NN e is set in the NN initial value f.

Next, the second learning unit 22 learns the second NN g for discriminating between noise and voice, by using the NN initial value f and the learning data a (step ST3). For example, the second learning unit 22 learns parameters of the second NN g by using the back propagation method.

Figure 6:
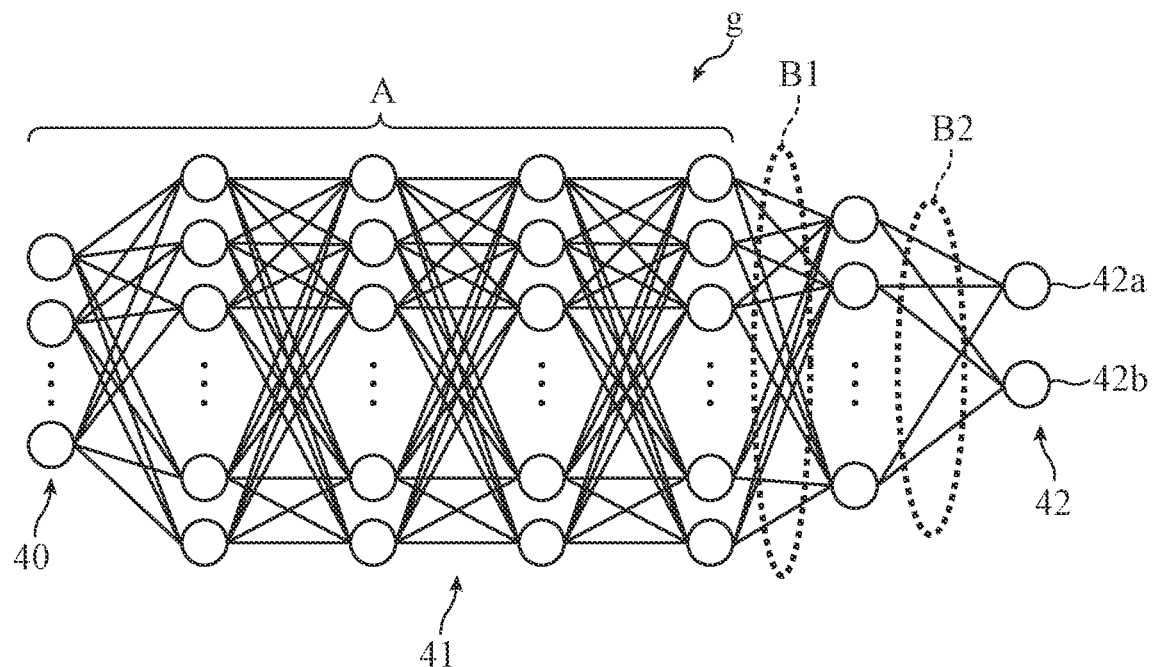
FIG. 6 is a diagram illustrating a structure of a second neural network.

FIG. 6 is a diagram illustrating a structure of the second NN g, and illustrates the structure of the second NN g learned by using the NN initial value f obtained on the basis of the first NN e illustrated in FIG. 5. For example, by using the back propagation method, the second learning unit 22 learns the input weight coefficients set as the random values for the NN initial value f so that the noise unit 42a outputs a high value when the input is noise and the voice unit 42b outputs a high value when the input is voice.

Input weight coefficients to be learned are input weight coefficients given to connections B1 between units of the final layer of the intermediate layer 41 and units of the newly inserted intermediate layer, and input weight coefficients given to connections B2 between the units of the newly inserted intermediate layer and units of the output layer, illustrated in FIG. 6. Input weight coefficients given to connections between units in layers other than these are not learned.

By learning the second NN g in this way, the input weight coefficients given to the connections B1 and the connections B2 in the second NN g are different from those of the first NN e. The number of units and the input weight coefficients given to connections between units in the layers other than these (a portion denoted by a reference sign A in FIG. 6) are the same as those in the first NN e. As described above, the second NN g is learned so that the units in the output layer 42 output the bottleneck feature value suitable for discrimination between noise and voice.

Subsequently, the network creating unit 23 creates the third NN h by using the second NN g (step ST4). The third NN h has a structure in which the output layer 42 of the second NN g is removed and the final layer of the intermediate layer 41 is a new output layer.

Figure 7:
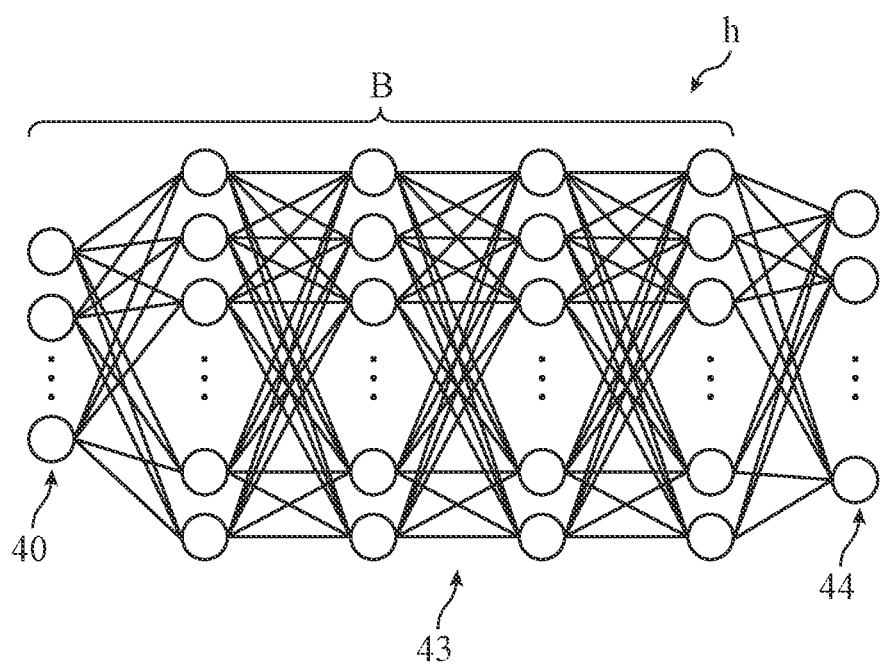
FIG. 7 is a diagram illustrating a structure of a third neural network.

FIG. 7 is a diagram illustrating the structure of the third NN h, and illustrates the third NN h created by using the second NN g illustrated in FIG. 6. The structure of the third NN h illustrated in FIG. 7 is the same as a structure obtained by removing the output layer 42 from the second NN g illustrated in FIG. 6, and a portion other than the final layer of the intermediate layer 41 illustrated in FIG. 6 is an intermediate layer 43, and the final layer of the intermediate layer 41 is an output layer 44.

In FIG. 7, the number of units and the values of the input weight coefficients of a portion denoted by a reference sign B (the input layer 40 and the intermediate layer 43) are the same values as those of the second NN g illustrated in FIG. 6. Since the second NN g has been learned so that the output value of the units of the output layer 42 is suitable for discrimination between noise and voice, the bottleneck feature value output from the output layer 44 of the third NN h is a value suitable for discrimination between noise and voice.

Next, the synthesis unit 24 creates the synthetic NN b by using the first NN e and the third NN h (step ST5). The synthetic NN b has the same structure as the structure other than the output layer with each of the first NN e and the third NN h, and is configured to calculate the likelihood of voice that is the output value of the first NN e and the bottleneck feature value that is the output value of the third NN h.

Figure 8:
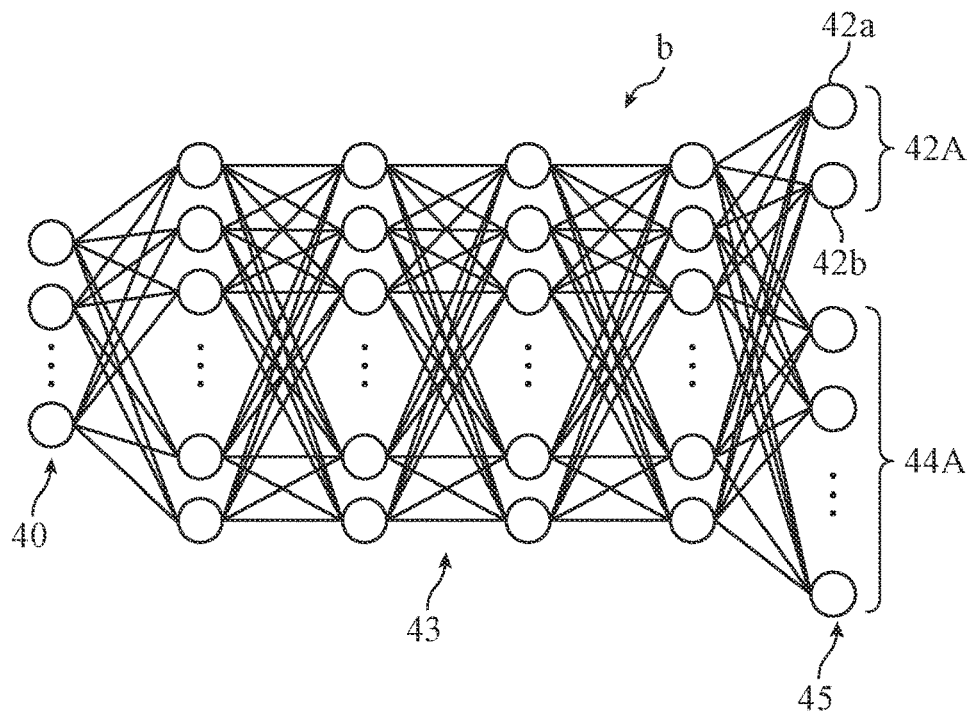
FIG. 8 is a diagram illustrating a structure of a synthetic neural network.

FIG. 8 is a diagram illustrating a structure of the synthetic NN b, and illustrates the synthetic NN b created by using the third NN h illustrated in FIG. 7. In the synthetic NN b, the number of units and the values of the input weight coefficients from the input layer 40 to the final layer of the intermediate layer 43 are the same values as those of the first NN e. An output layer 45 of the synthetic NN b includes the noise unit 42a and the voice unit 42b classified into a group 42A, and a plurality of units classified into a group 44A.

The noise unit 42a and the voice unit 42b classified into the group 42A correspond to the units of the output layer 42 of the first NN e. For connections between the noise unit 42a and the voice unit 42b and units of a layer immediately preceding the output layer 45, input weight coefficients of the same values are given as the input weight coefficients given to the connections between the units of the final layer of the intermediate layer 41 and the units of the output layer 42 in the first NN e.

The plurality of units classified into the group 44A corresponds to the units of the output layer 44 of the third NN h. For connections between the plurality of units classified into the group 44A and the units of the layer immediately preceding the output layer 45, input weight coefficients of the same values are given as the input weight coefficients given to the connections between the units of the final layer of the intermediate layer 43 of the third NN h and the units of the output layer 44.

From the input layer 40 to the final layer of the intermediate layer 43 in the synthetic NN b, the number of units and the input weight coefficients are the same as those from the input layer to the final layer of the intermediate layer in each of the first NN e and the third NN h. For this reason, the output value of the final layer of the intermediate layer 43 of the synthetic NN b is the same value as the output value of the final layer of the intermediate layer of each of the first NN e and the third NN h. As described above, in the synthetic NN b, the output value calculation processing from the input layer to the final layer of the intermediate layer is common to each of the first NN e and the third NN h, so that the likelihood of voice that is the output of the first NN e and the bottleneck feature value that is the output of the third NN h can be efficiently calculated.

The output values of the units of the output layer 45 can be calculated by using the input weight coefficients given to the connections between the units of each of the output layer 42 of the first NN e and the output layer 44 of the third NN e and the units of the corresponding immediately preceding layer. In addition, the output value of the units of the output layer 42 of the first NN e can be calculated as the output value of the units classified into the group 42A, and the output value of the units of the output layer 44 of the third NN h can be calculated as the output value of the units classified into the group 44A.

The model learning unit 25 learns the noise and voice GMM c by using the bottleneck feature value calculated by the third NN h, and the learning data a (step ST6).

For example, the model learning unit 25 sequentially inputs spectral feature values of the noise data included in the learning data a to the third NN h one by one. The third NN h calculates a bottleneck feature value suitable for discrimination between noise and voice regarding the spectral feature value of the noise data, and outputs the calculated bottleneck feature value to the model learning unit 25. The model learning unit 25 holds the bottleneck feature value calculated by the third NN h.

Upon holding the bottleneck feature values calculated for all the spectral feature values in the noise data, the model learning unit 25 learns a Gaussian mixture model of noise by using these feature values. When the maximum likelihood estimation method is used for learning the Gaussian mixture model, the model learning unit 25 calculates the average value, variance weight, and mixture weight of the feature values that are parameters of the Gaussian mixture model so that a likelihood of the spectral feature value included in the learning data a is maximized.

Note that, the model learning unit 25 learns a Gaussian mixture model of voice in a similar procedure also for voice data. The noise and voice GMM c includes the Gaussian mixture model of noise and the Gaussian mixture model of voice learned in this way.

The bottleneck feature value calculated by the third NN h is a feature value suitable for discrimination between noise and voice. For this reason, the learning processing of the Gaussian mixture model in the first embodiment can reduce the number of mixtures, as compared with the case of learning the Gaussian mixture distribution model by using the spectral feature value (MFCC) included in the learning data a. Thus, in the learning device 2, it is possible to reduce the storage capacity and the amount of calculation required for the learning processing.

In the Gaussian mixture model, a model of noise and a model of voice can be independently learned like the noise and voice GMM c.

On the other hand, in the learning of the neural network, the noise unit and the voice unit in the output layer cannot be independently learned, and a longer learning time is often required than in the Gaussian mixture model.

In contrast, when learning noise of a new noise environment, the learning device 2 only needs to learn the Gaussian mixture model of noise as the noise and voice GMM c, so that high-speed learning is possible.

Note that, although discrimination between noise and voice has been described, the learning device 2 may learn the synthetic NN b and the noise and voice GMM c to discriminate noise and vowels. In this case, it is possible to use the learning data a including spectral feature values of various noise data and spectral feature values of various vowel data.

Next, a description will be given of a voice activity detection processing by the voice activity detector 3.

Figure 9:
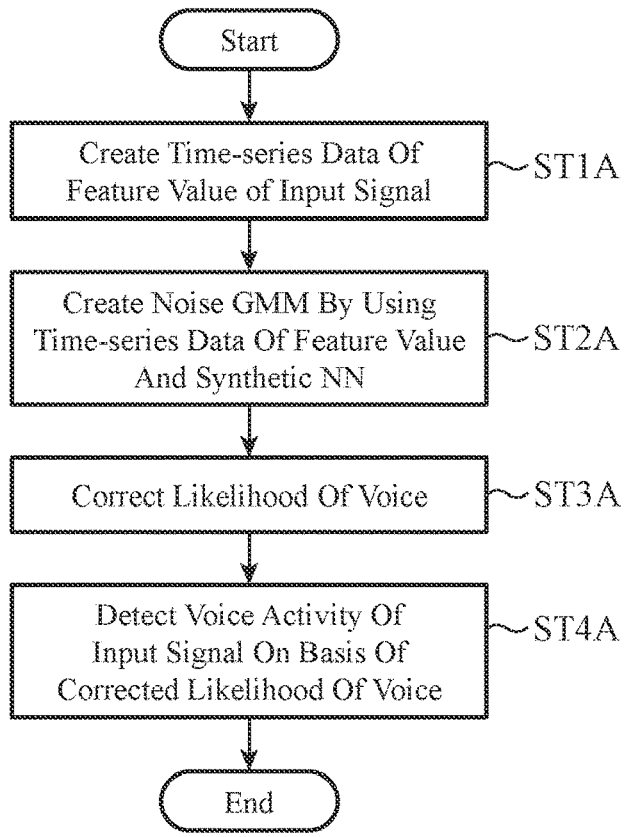
FIG. 9 is a flowchart illustrating a method for detecting voice activity according to the first embodiment.

FIG. 9 is a flowchart illustrating a method for detecting voice activity according to the first embodiment.

The analysis unit 30 analyzes a feature value of an input signal and creates time-series data of the feature value of the input signal (step ST1A). For example, the analysis unit 30 analyzes the spectral feature value of the input signal, and thereby creates time-series data in which feature values x(t) (t=1, 2, 3, . . . , T) as analysis results are arranged at certain time intervals. Here, T is the length of the time series. The time interval for arranging the feature values x(t) is, for example, 10 milliseconds. Types of the feature values of the input signal analyzed by the analysis unit 30 are the same as the types of the feature value of the noise data and the feature value of voice data included in the learning data a. For example, the analysis unit 30 creates time-series data of the MFCC of the input signal.

First, the analysis unit 30 analyzes the feature value of the input signal in the noise learning section, and creates the time-series data of the feature value of the input signal. The time-series data of the feature value of the input signal in the noise learning section is output from the analysis unit 30 to the model learning unit 31. For example, for the noise learning section, a time section from when the operation of the voice activity detector 3 is started to when 0.5 seconds elapses may be regarded as a noise learning section.

Next, for example, in a time section after the noise learning section, that is, in a time section in which noise and voice may be mixed in the input signal, the analysis unit 30 analyzes the feature value of the input signal, and creates the time-series data of the feature value of the input signal. The time-series data of the feature value of the input signal in this time section is output from the analysis unit 30 to the correction unit 32.

Upon receiving the time-series data of the feature value of the input signal in the noise learning section from the analysis unit 30, the model learning unit 31 learns the noise GMM d by using the synthetic NN b with the time-series data as an input (step ST2A). For example, the model learning unit 31 inputs the feature values in the time-series data one by one to the synthetic NN b, and causes the bottleneck feature value suitable for discrimination between noise and voice to be calculated for each of the feature values. The bottleneck feature value calculated for each of the feature values by the synthetic NN b is held in the model learning unit 31. Upon holding the bottleneck feature values for all the feature values in the time-series data, the model learning unit 31 learns the noise GMM d by using these bottleneck feature values.

For learning the noise GMM d, for example, a maximum likelihood estimation method is used. Here, the number of mixtures of the Gaussian mixture model is assumed as one. As described above, the analysis unit 30 outputs the feature value to the model learning unit 31 every 10 milliseconds. For this reason, when the noise learning section is 0.5 seconds, the model learning unit 31 learns the noise GMM d by using 0.5 seconds/10 milliseconds=50 feature values. Note that recent computers can learn the noise GMM d at a very high speed for about 50 feature values.

The correction unit 32 calculates the correction likelihood of voice by using the noise and voice GMM c and the noise GMM d with the time-series data of the feature value of the input signal as an input, and corrects the likelihood of voice calculated by the synthetic NN b with the time-series data of the feature value of the input signal as an input, on the basis of the correction likelihood of voice (step ST3A). For example, the correction unit 32 calculates a corrected likelihood of voice Sv2(t) by using a correction likelihood of voice So(t) (t=1, 2, 3, . . . , T) for each of the feature values of the input signal.

The detection unit 33 detects the voice activity of the input signal on the basis of a result of comparing the corrected likelihood of voice Sv2(t) with the detection threshold Sth (step ST4A). For example, the detection unit 33 detects, as the voice activity of the input signal, a time section in which the corrected likelihood of voice Sv2(t) is continuously greater than or equal to the detection threshold Sth for a certain time or longer. The detection threshold Sth is a threshold regarding a likelihood of voice to be determined as a voice activity. The detection unit 33 sets a time t at which the corrected likelihood of voice Sv2(t) is first greater than or equal to the detection threshold Sth as a start time Tb of the voice activity, and sets a time t at which the corrected likelihood of voice Sv2(t) is finally greater than or equal to the detection threshold Sth as an end time Te of the voice activity. The detection unit 33 outputs the time Tb and the time Te as voice activity detection results.

Next, processing for correcting the likelihood of voice will be described in detail.

Figure 10:
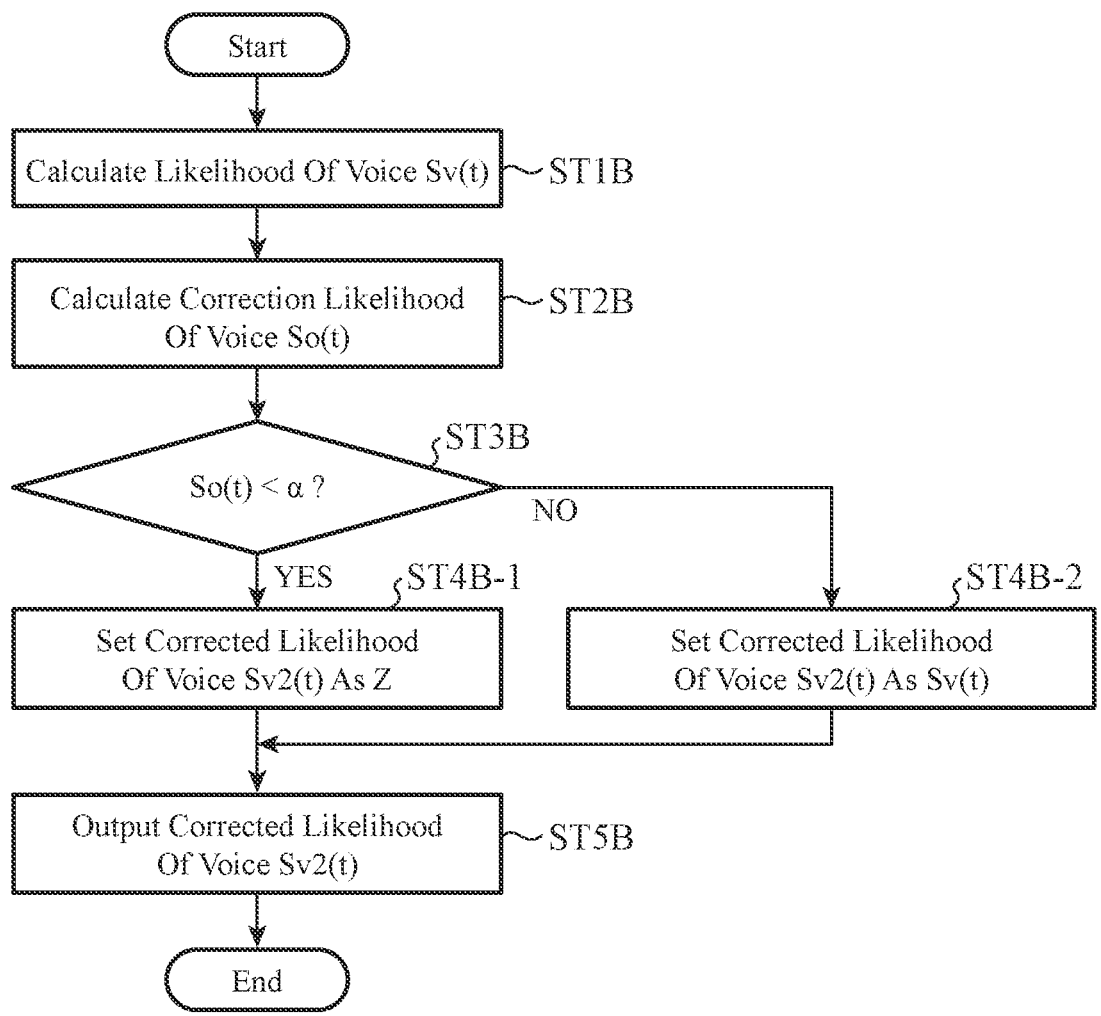
FIG. 10 is a flowchart illustrating processing for correcting a likelihood of voice in the first embodiment.

FIG. 10 is a flowchart illustrating the processing for correcting the likelihood of voice in the first embodiment, and illustrates detailed processing of step ST3A of FIG. 9.

The correction unit 32 inputs the feature value x(t) (t=1, 2, 3, . . . , T) of the input signal from the time-series data created in the time section after the noise learning section, to the synthetic NN b for each time t. The synthetic NN b calculates a likelihood of voice Sv(t) for each feature value x(t) (step ST1B). The likelihood of voice Sv(t) is obtained as a difference obtained by subtracting the output value of the noise unit 42a from the output value of the voice unit 42b.

With the feature value x(t) of the input signal as an input, the correction unit 32 calculates a log likelihood Ln(t) of the Gaussian mixture model of noise and a log likelihood Lv(t) of the Gaussian mixture model of voice for each feature value x(t). Further, with the feature value x(t) of the input signal as an input, the correction unit 32 calculates a log likelihood Ln 2(t) of the noise GMM d for each feature value x(t). Here, the Gaussian mixture model of noise and the Gaussian mixture model of voice are Gaussian mixture models constituting the noise and voice GMM c. In addition, the log likelihood is a natural logarithm of a value obtained by weighted sum of probability densities of the feature values in the Gaussian distributions indicated by the Gaussian mixture model, the probability densities being weighted by mixture weights of the respective Gaussian distributions.

The correction unit 32 calculates the correction likelihood of voice So(t) from the following equation (1) by using the log likelihood Lv(t), Ln(t), and Ln 2(t) (step ST2B). In the following equation (1), MAX (Ln(t), Ln 2(t)) is an operator indicating that a larger value out of Ln(t) and Ln 2(t) is selected.

$$So(t)=Lv(t)-MAX(Ln(t),Ln\ 2(t)) \quad (1)$$

The log likelihood Ln 2(t) of the noise GMM d is calculated from the noise GMM d learned in the noise learning section, and a time difference is small between the noise learning section and the current time t. For this reason, it is expected that the noise environment at the current time t is almost the same as that of the noise learning section. The log likelihood Ln 2(t) of the noise GMM d for loud noise has a large value, and the correction likelihood of voice So(t) calculated from the equation (1) has a low value. That is, even in an unknown noise environment not included in the learning data a, if the input signal is not voice but noise, the correction likelihood of voice So(t) has a low value.

The correction unit 32 determines whether or not the correction likelihood of voice So(t) is less than α in accordance with the following equation (2) (step ST3B). The symbol α is a constant set in the correction unit 32 as a first threshold regarding the correction likelihood of voice So(t). In the correction unit 32, a value of a is set that is experimentally determined in advance so that the input signal is discriminated as noise with a high probability (for example, a probability of greater than or equal to 95%) when the correction likelihood of voice So(t) is less than α.

When the correction likelihood of voice So(t) is less than α (step ST3B; YES), the correction unit 32 sets Z as the corrected likelihood of voice Sv2(t) (step ST4B-1). The symbol Z is a constant value smaller than the detection threshold Sth.

When the correction likelihood of voice So(t) is greater than or equal to a (step ST3B; NO), the correction unit 32 sets the likelihood of voice Sv(t) calculated by the synthetic NN b as it is, as the corrected likelihood of voice Sv2(t) (step ST4B-2).

$$Sv2(t)=Z(So(t)<\alpha)$$

$$Sv2(t)=Sv(t)(So(t)\geq\alpha) \quad (2)$$

The correction unit 32 sequentially outputs the corrected likelihood of voice Sv2(t) to the detection unit 33 for each time (step ST5B). Even when the calculation accuracy of the likelihood of voice Sv(t) decreases in the unknown noise environment and thereby the likelihood of voice Sv(t) has a high value in the noise activity, if the correction likelihood of voice So(t) is less than α, the correction unit 32 sets Z that is a value smaller than the detection threshold Sth, as the likelihood of voice Sv2(t). As a result, the detection unit 33 can be prevented from erroneously detecting the noise activity as a voice activity. The correction unit 32 repeatedly executes a series of processing steps illustrated in FIG. 10 from the time t=1 to T, and outputs the time-series data of the corrected likelihood of voice Sv2(t) to the detection unit 33.

Figure 11:
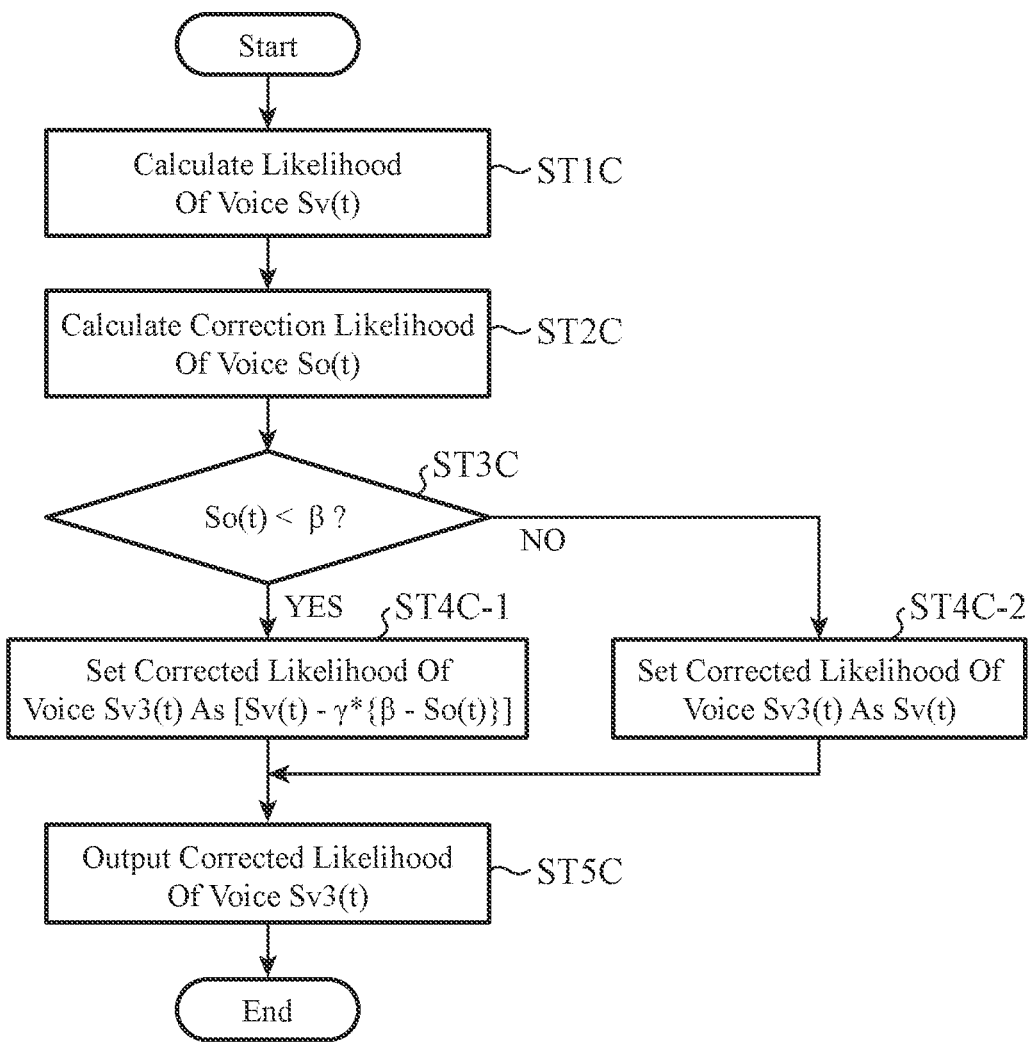
FIG. 11 is a flowchart illustrating another mode of the processing for correcting the likelihood of voice in the first embodiment.

The method for calculating the corrected likelihood of voice Sv2(t) is not limited to the processing based on the equation (2). For example, the correction unit 32 may calculate the corrected likelihood of voice Sv2(t) as described below. FIG. 11 is a flowchart illustrating another mode of the processing for correcting the likelihood of voice in the first embodiment. The processing from step ST1C to step ST2C in FIG. 11 is the same as the processing from step ST1B to step ST2B in FIG. 10, so that a description thereof will be omitted.

The correction unit 32 determines whether or not the correction likelihood of voice So(t) is less than β in accordance with the following equation (3) (step ST3C). When the correction likelihood of voice So(t) is less than β (step ST3C; YES), the correction unit 32 sets [Sv(t)−γ*{β−So(t)}] as the corrected likelihood of voice Sv3(t) (step ST4C-1). The symbol β is a constant set in the correction unit 32 as a second threshold regarding the correction likelihood of voice So(t). The symbol γ is a positive constant.

In the correction unit 32, values of β and γ for deriving γ*{β−So(t)} by which the value of the corrected likelihood of voice Sv3(t) is less than the detection threshold Sth are experimentally determined and set in advance so that the input signal is discriminated as noise with a high probability (for example, a probability of greater than or equal to 95%) when the correction likelihood of voice So(t) is less than β.

When the correction likelihood of voice So(t) is greater than or equal to β (step ST3C; NO), the correction unit 32 sets the likelihood of voice Sv(t) calculated by the synthetic NN b as it is, as the corrected likelihood of voice Sv3(t) (Step ST4C-2).

$$Sv3(t)=Sv(t)-\gamma*\{\beta-So(t)\}(So(t)<\beta)$$

$$Sv3(t)=Sv(t)(So(t)\geq\beta) \quad (3)$$

The correction unit 32 sequentially outputs the corrected likelihood of voice Sv3(t) to the detection unit 33 for each time (step ST5C). Even when the calculation accuracy of the likelihood of voice Sv(t) by the synthetic NN b decreases in the unknown noise environment and thereby the likelihood of voice Sv(t) has a high value in the noise activity, if the correction likelihood of voice So(t) is less than β, the correction unit 32 calculates the corrected likelihood of voice Sv3(t) so that the likelihood of voice Sv(t) is lowered to be less than the detection threshold Sth. As a result, the detection unit 33 can be prevented from erroneously detecting the noise activity as a voice activity. The correction unit 32 repeatedly executes a series of processing steps illustrated in FIG. 11 from the time t=1 to T, and outputs the time-series data of the corrected likelihood of voice Sv3(t) to the detection unit 33.

Functions of the first learning unit 20, the initial value creating unit 21, the second learning unit 22, the network creating unit 23, the synthesis unit 24, and the model learning unit 25 in the learning device 2 are implemented by a processing circuit. That is, the learning device 2 includes the processing circuit for executing the processing from step ST1 to step ST6 illustrated in FIG. 4.

Similarly, functions of the analysis unit 30, the model learning unit 31, the correction unit 32, and the detection unit 33 in the voice activity detector 3 are implemented by a processing circuit. That is, the voice activity detector 3 includes the processing circuit for executing the processing from step ST1A to step ST4A illustrated in FIG. 9. Each of the processing circuits may be dedicated hardware, or a central processing unit (CPU) for executing a program stored in a memory.

Figure 12A:
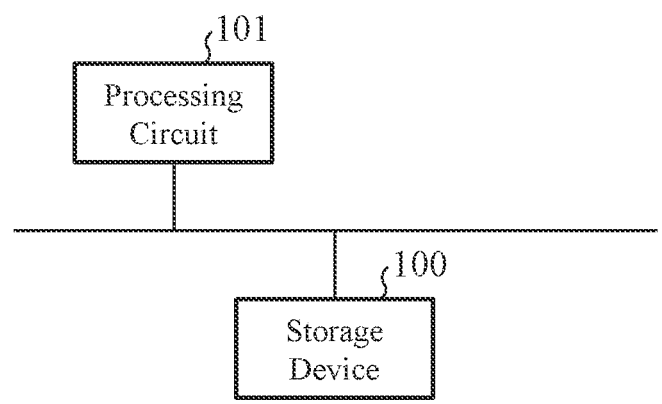
FIG. 12A is a block diagram illustrating a hardware configuration for implementing a function of the learning device or the voice activity detector according to the first embodiment.
Figure 12B:
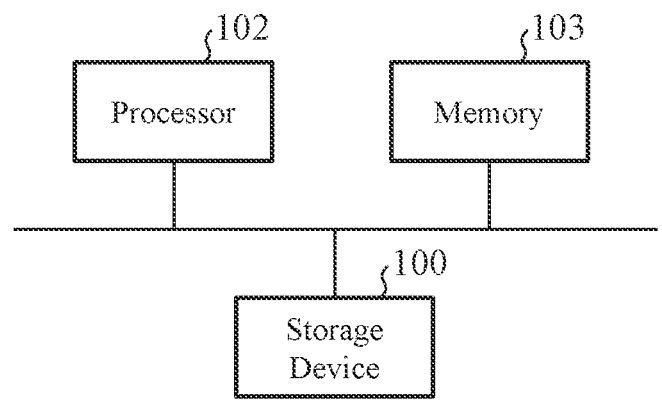
FIG. 12B is a block diagram illustrating a hardware configuration for executing software for implementing the function of the learning device or the voice activity detector according to the first embodiment.

FIG. 12A is a block diagram illustrating a hardware configuration for implementing a function of the learning device 2 or the voice activity detector 3. FIG. 12B is a block diagram illustrating a hardware configuration for executing software for implementing the function of the learning device 2 or the voice activity detector 3.

When the learning device 2 has the hardware configuration illustrated in FIG. 12A or FIG. 12B, a storage device 100 stores parameters of the learned neural network, and parameters of the learned noise and voice GMM c, in addition to the learning data a and the NN initial value f. The parameters of the learned neural network are, for example, structural data defining the structure of each of the synthetic NN b, the first NN e, the second NN g, and the third NN h, and the learned input weight coefficients.

When the voice activity detector 3 has the hardware configuration illustrated in FIG. 12A or FIG. 12B, the storage device 100 stores the parameters of the learned synthetic NN b, the parameters of the learned noise and voice GMM, and parameters of the learned noise GMM d.

Note that, the storage device 100 may be shared by the learning device 2 and the voice activity detector 3. Further, the storage device 100 may be a constituent element included in the learning device 2 or the voice activity detector 3, or may be included in a device independent of the learning device 2 and the voice activity detector 3. For example, the storage device 100 may be a device on a communication network that can be accessed by communication from the learning device 2 and the voice activity detector 3.

When the processing circuit included in the learning device 2 or the voice activity detector 3 is a dedicated hardware processing circuit 101 illustrated in FIG. 12A, examples of the processing circuit 101 include a single circuit, a composite circuit, a programmed processor, a parallel-programmed processor, an application specific integrated circuit (ASIC), a field-programmable gate array (FPGA), or a combination thereof. The functions of the first learning unit 20, the initial value creating unit 21, the second learning unit 22, the network creating unit 23, the synthesis unit 24, and the model learning unit 25 in the learning device 2 may be implemented by separate processing circuits, or these functions may be collectively implemented by one processing circuit. The functions of the analysis unit 30, the model learning unit 31, the correction unit 32, and the detection unit 33 in the voice activity detector 3 may be implemented by separate processing circuits, or these functions may be collectively implemented by one processing circuit.

When the processing circuit is a processor 102 illustrated in FIG. 12B, the functions of the first learning unit 20, the initial value creating unit 21, the second learning unit 22, the network creating unit 23, the synthesis unit 24, and the model learning unit 25 in the learning device 2 are implemented by software, firmware, or a combination of software and firmware. In addition, the functions of the analysis unit 30, the model learning unit 31, the correction unit 32, and the detection unit 33 in the voice activity detector 3 are implemented by software, firmware, or a combination of software and firmware. Note that, the software or the firmware is described as a program and stored in a memory 103.

The processor 102 reads and executes the program stored in the memory 103, thereby implementing the functions of the first learning unit 20, the initial value creating unit 21, the second learning unit 22, the network creating unit 23, the synthesis unit 24, and the model learning unit 25 in the learning device 2. That is, the learning device 2 includes the memory 103 for storing programs by which the processing from step ST1 to step ST6 illustrated in FIG. 4 is resultantly executed when executed by the processor 102. These programs cause a computer to execute procedures or methods of the first learning unit 20, the initial value creating unit 21, the second learning unit 22, the network creating unit 23, the synthesis unit 24, and the model learning unit 25.

The memory 103 may be a computer-readable storage medium storing a program for causing the computer to function as the first learning unit 20, the initial value creating unit 21, the second learning unit 22, the network creating unit 23, the synthesis unit 24, and the model learning unit 25.

Similarly, the processor 102 reads and executes the program stored in the memory 103, thereby implementing the respective functions of the analysis unit 30, the model learning unit 31, the correction unit 32, and the detection unit 33 in the voice activity detector 3. That is, the voice activity detector 3 includes the memory 103 for storing programs by which the processing from step ST1A to step ST4A illustrated in FIG. 9 is resultantly executed when executed by the processor 102. These programs cause a computer to execute procedures or methods of the analysis unit 30, the model learning unit 31, the correction unit 32, and the detection unit 33.

The memory 103 may be a computer-readable storage medium storing a program for causing the computer to function as the analysis unit 30, the model learning unit 31, the correction unit 32, and the detection unit 33.

Examples of the memory 103 include a nonvolatile or volatile semiconductor memory such as random access memory (RAM), read only memory (ROM), flash memory, erasable programmable read only memory (EPROM), or electrically-EPROM (EEPROM), a magnetic disk, a flexible disk, an optical disk, a compact disk, a mini disk, a DVD, and the like.

Some of the functions of the first learning unit 20, the initial value creating unit 21, the second learning unit 22, the network creating unit 23, the synthesis unit 24, and the model learning unit 25 may implemented by dedicated hardware, and some of the functions may be implemented by software or firmware. For example, the functions of the first learning unit 20, the initial value creating unit 21, the second learning unit 22, and the network creating unit 23 are implemented by a processing circuit as dedicated hardware. The functions of the synthesis unit 24 and the model learning unit 25 may be implemented by causing the processor 102 to read and execute the program stored in the memory 103. The same applies to the analysis unit 30, the model learning unit 31, the correction unit 32, and the detection unit 33 in the voice activity detector 3.

As described above, the processing circuit can implement the functions by the hardware, software, firmware, or a combination thereof.

As described above, in the learning device 2 according to the first embodiment, the synthesis unit 24 creates the synthetic NN b, and the model learning unit 25 learns the noise and voice GMM c. Since the model learning unit 25 learns the noise and voice GMM c by using the learning data a, the number of mixtures can be reduced as compared with the case of learning a Gaussian mixture distribution model by using the feature value included in the learning data a. Thus, in the learning device 2, it is possible to reduce the storage capacity and the amount of calculation required for the learning processing. In addition, the voice activity detector 3 uses the synthetic NN b created by the learning device 2 and the noise and voice GMM c, whereby robust voice activity detection processing is possible even in the unknown noise environment.

In the voice activity detector 3 according to the first embodiment, the analysis unit 30 creates the time-series data of the feature value of the input signal. The model learning unit 31 learns the noise GMM d by using the time-series data of the feature value created by the analysis unit 30, in the time section in which the input signal is noise. The correction unit 32 corrects the likelihood of voice by using the noise GMM d. The detection unit 33 detects the voice activity of the input signal on the basis of a comparison result between the corrected likelihood of voice and the detection threshold Sth. The voice activity detector 3 corrects the likelihood of voice that is a discrimination measure between noise and voice by using the noise GMM d learned in the time section in which the input signal is noise, and detects the voice activity on the basis of the corrected likelihood of voice, so that the detection accuracy of the voice activity of the input signal can be improved.

For example, even when the likelihood of voice Sv(t) has a high value in the unknown noise environment, if the correction likelihood of voice So(t) calculated by using the noise GMM d is less than α, the voice activity detector 3 corrects the likelihood of voice Sv(t) to a likelihood of voice not greater than or equal to the detection threshold Sth. As a result, the noise activity can be prevented from being erroneously detected as a voice activity.

Note that, the present invention is not limited to the embodiment described above, and within the scope of the present invention, any constituent element of the embodiment can be modified or any constituent element of the embodiment can be omitted.

INDUSTRIAL APPLICABILITY

The learning device according to the present invention can improve the detection accuracy of a voice activity of an input signal in a voice activity detector, and thus can be used for a device that needs to detect a voice activity, for example, a voice recognition device.

REFERENCE SIGNS LIST

1: voice activity detection system, 2: learning device, 3: voice activity detector, 20: first learning unit, 21: initial value creating unit, 22: second learning unit, 23: network creating unit, 24: synthesis unit, 25, 31: model learning unit, 30: analysis unit, 32: correction unit, 33: detection unit, 40: input layer, 41, 43: intermediate layer, 42, 44, 45: output layer, 42A, 44A: group, 42a: noise unit, 42b: voice unit, 100: storage device, 101: processing circuit, 102: processor, 103: memory.

The invention claimed is:

1. A learning device to learn a synthetic neural network and a Gaussian mixture model of noise and voice in a voice activity detector to detect a voice activity of an input signal, the learning device comprising:

processing circuitry to learn a first neural network in such a manner that the first neural network calculates a likelihood of voice that is a discrimination measure between noise and voice, with a feature value of noise data and a feature value of voice data as learning data;

to create an initial value of a neural network indicating a structure in which a new intermediate layer is inserted between an output layer and a final layer of an intermediate layer of the first neural network;

to learn a second neural network in such a manner that the second neural network discriminates between noise and voice, by using the initial value of the neural network and the learning data;

to create a third neural network, the third neural network having a structure in which an output layer of the second neural network is removed and a final layer of an intermediate layer of the second neural network is a new output layer, to output a bottleneck feature value suitable for discrimination between noise and voice from the new output layer;

to create the synthetic neural network, the synthetic neural network having parameters defining a same structure as a structure other than the output layer of each of the first neural network and the third neural network, to calculate the likelihood of voice and the bottleneck feature value; and to learn the Gaussian mixture model of noise and voice, by using the bottleneck feature value output from the third neural network, and the learning data.

2. A voice activity detector comprising:
processing circuitry
to analyze a feature value of an input signal and of create time-series data of the feature value of the input signal;
to calculate the bottleneck feature value by using the synthetic neural network created by the learning device according to claim 1 with the created time-series data of the feature value as an input, in a time section in which the input signal is noise, and to learn a Gaussian mixture model of noise in the time section by using the calculated bottleneck feature value;
to calculate a correction likelihood of voice by using the Gaussian mixture model of noise and voice learned by the learning device according to claim 1 and the learned Gaussian mixture model of noise with the created time-series data of the feature value as an input, and to correct the likelihood of voice calculated by the synthetic neural network, by using the correction likelihood of voice; and
to detect a voice activity of the input signal on a basis of a result of comparing the corrected likelihood of voice with a detection threshold.

3. The voice activity detector according to claim 2, wherein
the processing circuitry detects au activity in which the corrected likelihood of voice is greater than or equal to the detection threshold, as the voice activity of the input signal, and
corrects the likelihood of voice calculated by the synthetic neural network to a value smaller than the detection threshold, when the correction likelihood of voice is less than a first threshold.

4. The voice activity detector according to claim 2, wherein
the processing circuitry detects an activity in which the corrected likelihood of voice is greater than or equal to the detection threshold, as the voice activity of the input signal, and
lowers the likelihood of voice calculated by the synthetic neural network to a value smaller than the detection threshold by using the correction likelihood of voice, when the correction likelihood of voice is less than a second threshold.

5. A method of detecting voice activity, comprising:
analyzing a feature value of an input signal creating time-series data of the feature value of the input signal;
calculating the bottleneck feature value by using the synthetic neural network created by the learning device according to claim 1 with the created time-series data of the feature value as an input, in a time section in which the input signal is noise, and learning a Gaussian mixture model of noise in the time section by using the calculated bottleneck feature value;
calculating a correction likelihood of voice by using the Gaussian mixture model of noise and voice learned by the learning device according to claim 1 and the learned Gaussian mixture model of noise with the created time-series data of the feature value as an input, and correcting the likelihood of voice calculated by the synthetic neural network, by using the correction likelihood of voice; and
detecting a voice activity of the input signal on a basis of a result of comparing the corrected likelihood of voice with a detection threshold.

* * * * *